March 22, 1960 H. G. YATES 2,929,218
ELASTIC FLUID TURBINES
Filed Nov. 18, 1953 5 Sheets-Sheet 3
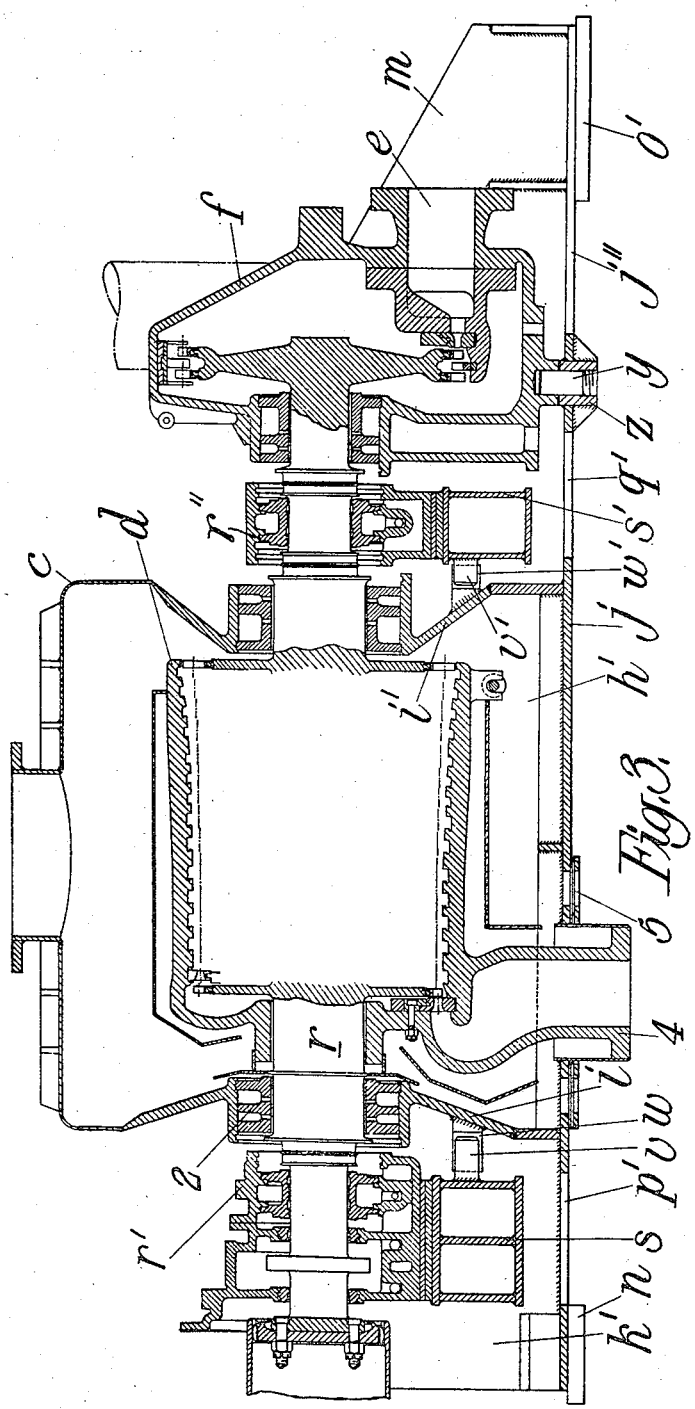

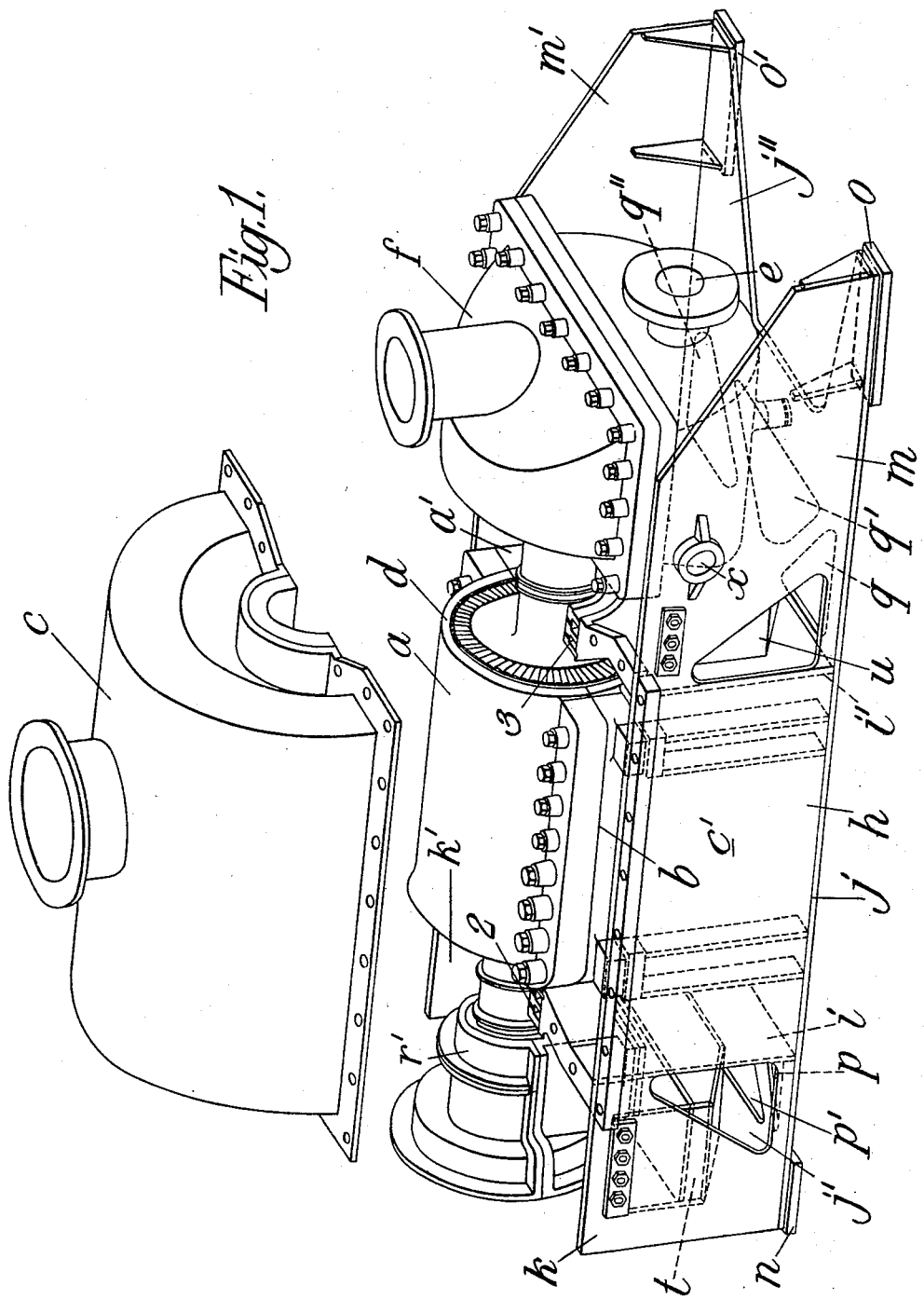

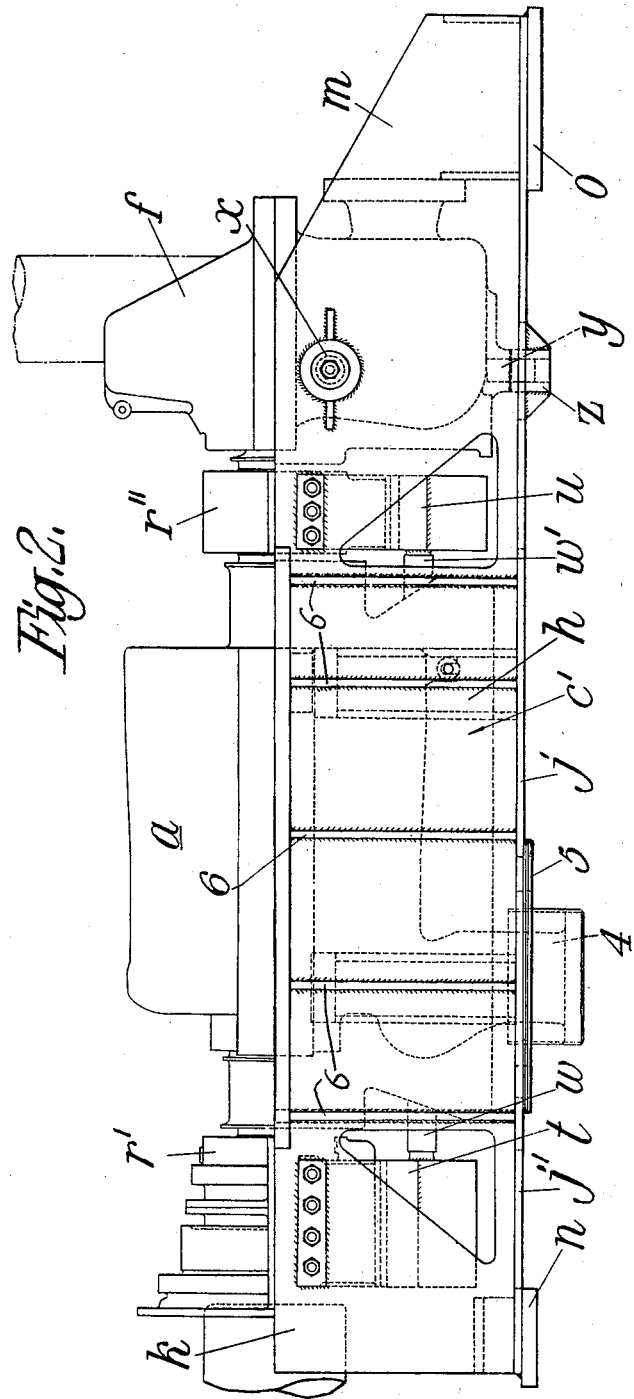

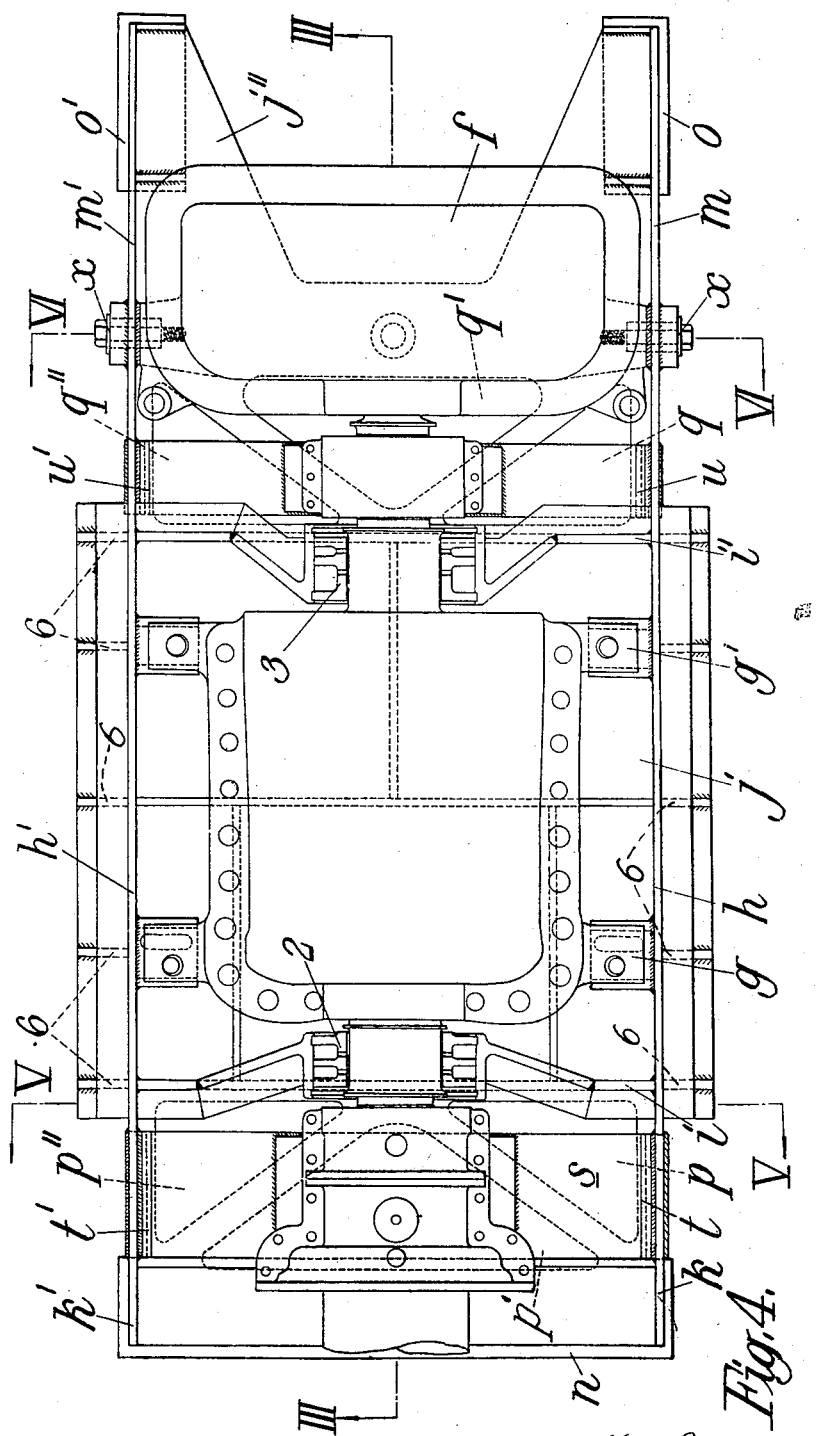

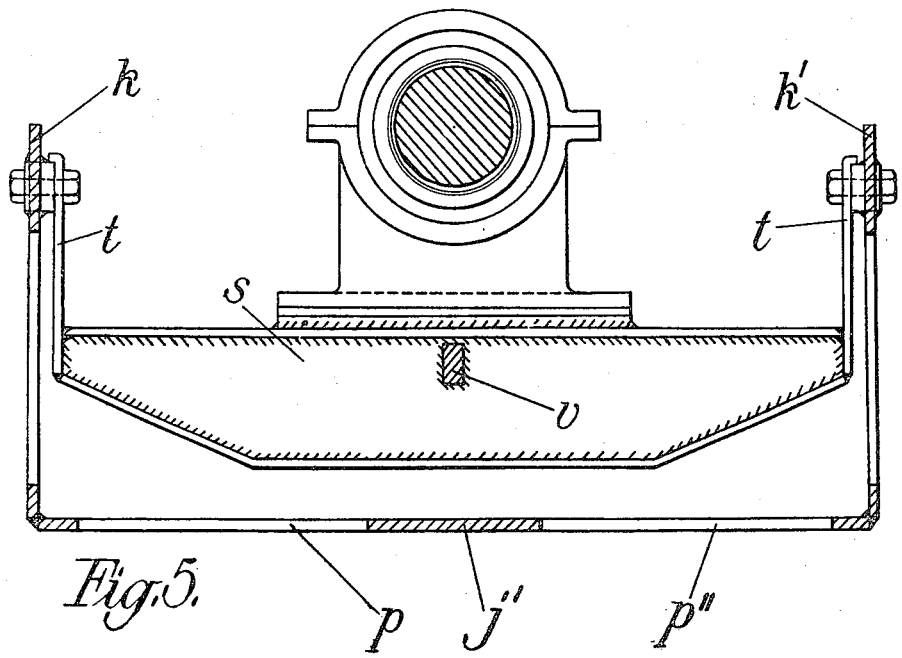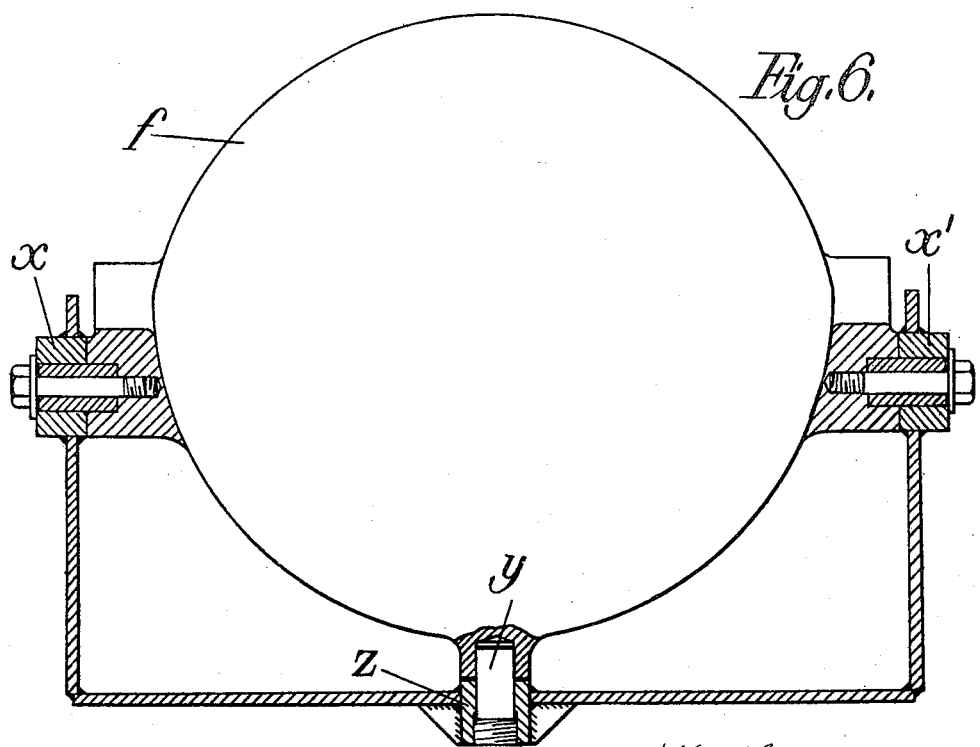

United States Patent Office 2,929,218
Patented Mar. 22, 1960

2,929,218

ELASTIC FLUID TURBINES

Henry George Yates, Riding Mill, England, assignor to The Parsons and Marine Engineering Turbine Research and Development Association, Wallsend, England Application November 18, 1953, Serial No. 392,842

Claims priority, application Great Britain January 29, 1953

5 Claims. (Cl. 60—102)

This invention relates to elastic fluid turbines and more particularly to such turbines intended to operate at high temperatures.

In the design of elastic fluid turbines, particularly for operating at high temperatures, it is necessary to provide means for supporting the turbine in the correct relationship to the shaft which it drives. It is also desirable to support the bearings in which the rotor is journalled in such a way that the rotor is maintained concentric with the longitudinal axis of the turbine at all times, and nevertheless, to ensure that the heated parts of the turbine are free to expand as required by the operating temperature of the different parts.

Various ways to achieve these objects are known, many of them embodying the location of one member in relation to another by means of mating surfaces capable of relative sliding and located against relative motion in certain directions by means of keys or pins.

It is an object of the present invention to enable the desired conditions to be attained with a reduced number of such means of support and in a fashion suitable for easy construction.

The invention consists in an elastic fluid turbine embodying features as set forth in the claims appended hereto.

Referring to the accompanying diagrammatic drawings:

Figure 1 is a perspective sketch illustrating one convenient construction embodying the present invention;

Figure 2 is an elevational view of this construction with top outer cover removed;

Figure 3 is a vertical longitudinal sectional elevation thereof;

Figure 4 is a plan view at the horizontal joint thereof;

Figure 5 is a sectional view on the line V—V of Figure 4; and

Figure 6 is a sectional view on the line VI—VI of Figure 4.

In carrying the invention into effect according to one form by way of example as illustrated in Figures 1-6, elastic fluid at high pressure and temperature is admitted to an inner barrel $a$, $a'$ split at $b$ for convenience of assembly, this barrel being supported within an outer casing $c$, $c'$ also split of which the bottom half $c'$ is of approximately rectangular form, the inner barrel being open at its exhaust end $d$ in order that fluid may be discharged directly into the outer casing $c$, $c'$ and thence by a suitable pipe (not shown) to the inlet duct $e$ of a low pressure turbine $f$ which expands the fluid to a still lower pressure. The inner barrel $a$, $a'$ is supported within the outer casing by sliding palms $g$, $g'$ with suitable locating keys in the known manner.

The bottom half $c'$ of the outer casing is composed of two vertical parallel side plates $h$, $h'$, two vertical parallel end plates $i$, $i'$ and a base plate $j$, these members being connected together by welding.

The base plate $j$ is furnished with extension $j'$, $j''$ and the side plates $h$, $h'$ with extensions $k$, $k'$, $m$, $m'$ that are rendered comparatively flexible by the provision of suitable triangular openings such that one vertical edge of each opening runs parallel to the adjacent end wall of the casing and close to it and a second horizontal edge extends close to the lower edge of each side plate extension.

The ends of the side plate extensions are provided with feet $n$ and $o$, $o'$ which may rest on a suitable seating, the feet at one end being preferably fixed, while those at the other end are allowed freedom of longitudinal motion, either by sliding on the seating or by furnishing the seating with sufficient flexibility in the longitudinal direction to accommodate axial expansion of the side plates. This expansion, however, is not great, since the side plates are only subjected over part of their length to comparatively cool fluid at the temperature at which the fluid leaves the turbine.

The extensions $j'$, $j''$ of the base plate $j$ have three triangular openings, $p$, $p'$, $p''$ and $q$, $q'$, $q''$, two of each set disposed near the side edges of the bottom plates and the third ($p'$, $q'$) centrally disposed, all three openings having apices near the mid point of the lower edge of the adjacent end wall $i$, $i'$.

By this means the four upper corners of the lower casing $c'$ are connected to the turbine feet by solid plates, whereas the four lower corners are connected to them by comparatively slender bars capable of bending sufficiently to accommodate thermal expansion of the casing without overstress. At the same time the mid point of the lower edges of the end walls $i$, $i'$ of the casing is maintained on the longitudinal centre line of the turbine. The great strength of the side plates $h$, $h'$ and their longitudinal extensions $k$, $k'$ and $m$, $m'$ against forces tending to cause deflection in the vertical direction ensures that the structure is very rigid against torsional deflection about any axis parallel to the longitudinal turbine axis, and this in conjunction with the action of the base plate, already described, retains the longitudinal axis of the turbine in its correct position.

The bearings $r'$, $r''$ in which the rotor $r$ is journalled are carried on transverse beams $s$, $s'$ arranged between the longitudinal extensions of the side plates with a slight clearance to allow lateral motion of the side plates due to thermal expansion. The transverse beams are slung from positions near upper edges of the side plate extensions by plate slings $t$, $t'$, $u$, $u'$ lying in planes parallel to those of the main side plates. The plate slings are attached at their lower edges to the transverse beams, conveniently by welding, and permit lateral expansion of the side plate extensions relative to the transverse beams but are very rigid against relative motion in any other direction.

In order to maintain the bearing co-axial with the turbine, horizontal keys $v$, $v'$ are provided in a well known manner on the sides of the transverse beams $s$, $s'$ respectively adjacent to the end walls of the turbine, lying in a vertical plane containing the turbine axis. These keys engage vertical keyways $w$, $w'$ provided on the end walls $i$, $i'$ of the outer casing, and serve to provide correct lateral location of the bearings relative to the turbine axis.

It is sometimes desirable to provide further turbine blading carried on the same rotor beyond one of the bearings but housed in a separate casing. This blading may be arranged for either the same or opposite direction of rotation as the main turbine blading, but is frequently designed as an astern turbine. The casing of such further turbine $f$ may conveniently be supported by trunnions $x$, $x'$ journalled in the side plate extensions near their upper edges, and located against axial or transverse movement by a vertical pin $y$ carried in a boss $z$ arranged on the centre line of the base extension plate and engaging with a hole in a suitable facing provided at the bottom of the turbine casing $f$.

The end walls $i, i'$ are formed of steel plates having central conical portions adapted to carry gland housings 2, 3. Conveniently steam is admitted to the inner barrel of the main turbine by a vertical pipe 4 and beneath the turbine, this pipe passing through a hole in the bottom plate $j$, the space between the pipe and the wall of the hole being sealed by a flexible diaphragm plate 5 or other convenient means.

The main side plates are provided with suitable flanges at their upper edges, by which the upper half casing may be attached to the lower half. These flanges may if desired be extended over the longitudinal extensions of the side plates, provided that the side plates themselves have sufficient flexibility in a lateral direction to accommodate lateral expansion of the turbine by slight bending of the side plates about longitudinal axes near their lower edges.

In the above arrangement the cutting away of triangular openings in the side plate and base plate effectively leaves the outer casing united to the main feet by angle sections. If desirable, the lower extensions of the side plates may be combined with the extensions of the bottom plate into single members extending axially but having their planes inclined to the horizontal. By this means a single plate is arranged at right angles to a line drawn from the turbine axis to the bottom corner of the outer casing.

In some cases it may be desirable to augment the cooling of the side plate and bottom plate extensions, e.g., by providing closely spaced ribs 6 to increase radiant and convective cooling, cooling coils encircling the parts adjacent to the hot casing or passages for cooling fluid in the body of the wall extensions near the external casing.

I claim:

1. In an elastic fluid turbine, and in combination, a split inner barrel, a rotor within the barrel, an outer casing encircling and spaced apart from said barrel, said barrel having an exhaust opening communicating directly with the space between said barrel and said casing, bearings external to the casing supporting the rotor, supporting means between said casing and said barrel, the lower portion of said casing comprising two vertical parallel side plates, two vertical parallel end plates and a base plate, these plates being united to form a rigid structure and said supporting means being supported by the upper part of the said rigid structure, said base plate and side plates having substantially coplanar extensions projecting from the said rigid structure beyond the end plates thereof and possessing a substantial degree of flexibility in directions at right angles to the longitudinal axis of the turbine, and means for supporting said plate extensions at points spaced from the said end plates for thereby supporting the said rigid structure.

2. An elastic fluid turbine as claimed in claim 1 wherein said end plates embody central conical parts and comprising gland housings carried by the said conical parts for sealing at the ends of the said barrel.

3. An elastic fluid turbine as claimed in claim 1 comprising also rigid transverse beams, and plate slings supporting the beams from positions near the upper edges of said side plate extensions, the said plate slings lying in planes parallel to the planes of the side plates, said beams being located laterally, clearance for expansion being provided between the ends of the beams and the said beams comprising means for carrying the side plates and rotor bearing journals.

4. An elastic fluid turbine as claimed in claim 1 including a further and separate turbine casing, trunnions journalled in two neighboring said side plate extensions near their upper edges for supporting said further casing, and a vertical pin carried in a boss arranged on the centre line of a bottom plate extension engaging with a hole in a suitable facing provided at the bottom of said further casing, serving to locate said further casing against axial and transverse movements.

5. An elastic fluid turbine as claimed in claim 1 embodying means for augmenting cooling, comprising closely spaced ribs on said side plates to increase radiant and convective cooling.

References Cited in the file of this patent

UNITED STATES PATENTS

| | | |
|---|---|---|
| 1,791,657 | Brown | Feb. 10, 1931 |
| 2,364,961 | Durham | Dec. 12, 1944 |
| 2,531,178 | Van Nest | Nov. 21, 1950 |

FOREIGN PATENTS

| | | |
|---|---|---|
| 448,402 | Great Britain | June 8, 1936 |
| 612,132 | Great Britain | Nov. 9, 1948 |
| 612,133 | Great Britain | Nov. 9, 1948 |